(12) United States Patent
Hu et al.

(10) Patent No.: US 10,222,969 B2
(45) Date of Patent: Mar. 5, 2019

(54) DATA TRANSMISSION METHOD AND DEVICE

(71) Applicants: ZHUHAI KINGSOFT OFFICE SOFTWARE CO., LTD., Zhuhai (CN); Beijing Kingsoft Office Software, Inc, Beijing (CN); GUANGZHOU KINGSOFT MOBILE TECHNOLOGY CO., LTD., Guangzhou (CN)

(72) Inventors: Juan Hu, Zhuhai (CN); Lanhua Huang, Zhuhai (CN); Dawei Wang, Zhuhai (CN); Haiwei He, Zhuhai (CN); Yong Zhuang, Zhuhai (CN)

(73) Assignees: ZHUHAI KINGSOFT OFFICE SOFTWARE CO., LTD., Zhuhai (CN); BEIJING KINGSOFT OFFICE SOFTWARE, INC, Beijing (CN); GUANGZHOU KINGSOFT MOBILE TECHNOLGY CO., LTD., Guangzhou (CN)

( * ) Notice: Subject to any disclaimer, the term of this patent is extended or adjusted under 35 U.S.C. 154(b) by 253 days.

(21) Appl. No.: 15/165,899

(22) Filed: May 26, 2016

(65) Prior Publication Data
US 2017/0160895 A1   Jun. 8, 2017

(30) Foreign Application Priority Data

Dec. 4, 2015   (CN) .......................... 2015 1 0888681

(51) Int. Cl.
*H04M 1/725* (2006.01)
*G06F 3/0481* (2013.01)
(Continued)

(52) U.S. Cl.
CPC ........ *G06F 3/0486* (2013.01); *G06F 3/04817* (2013.01); *G06F 3/04883* (2013.01);
(Continued)

(58) Field of Classification Search
CPC .......................... G06F 3/0481; G06F 3/04883
(Continued)

(56) References Cited

U.S. PATENT DOCUMENTS

| 2008/0077956 A1* | 3/2008 | Morrison | ........... G06Q 30/0613 725/38 |
| 2011/0004489 A1* | 1/2011 | Schoenberg | ........ G06F 19/3456 705/3 |

(Continued)

*Primary Examiner* — Cao H Nguyen
(74) *Attorney, Agent, or Firm* — Patterson & Sheridan, LLP; Steven Versteeg (57) ABSTRACT

Embodiments of the present invention provide a data transmission method and device, which are to be applied to a source client, wherein the source client is a client in a foreground running status in a mobile terminal, the mobile terminal, by means of a split-screen function, divides the display screen thereof into a first split screen for displaying a running interface of the source client and a second split screen for displaying a running interface of a target client, the target client is a client in a foreground running status in the mobile terminal. The method comprises: establishing a communication connection between the source client and the target client; receiving a drag instruction for a thumbnail of target data in the source client and moving the thumbnail according to the drag instruction; monitoring whether a data transmission instruction for the target data is received, if yes, transmitting the target data to the target client through the established communication connection. By applying the embodiments of the present invention, users can make full advantage of the split-screen technology, which simplifies data transmission operation.

8 Claims, 7 Drawing Sheets

(51) Int. Cl.
*G06F 3/0486* (2013.01)
*G06F 3/0488* (2013.01)

(52) U.S. Cl.
CPC .... *G06F 3/04886* (2013.01); *H04M 1/72522* (2013.01); *G06F 2203/04803* (2013.01)

(58) Field of Classification Search
USPC .......................................... 715/769, 768, 732
See application file for complete search history.

(56) References Cited

U.S. PATENT DOCUMENTS

| | | | | |
|---|---|---|---|---|
| 2011/0119610 | A1* | 5/2011 | Hackborn | G06F 3/0481 715/768 |
| 2014/0157163 | A1* | 6/2014 | Strutin-Belinoff | G06F 3/04883 715/769 |
| 2014/0282013 | A1* | 9/2014 | Amijee | G06F 3/0482 715/732 |
| 2015/0242086 | A1* | 8/2015 | Mindlin | G06F 3/0481 715/769 |

* cited by examiner

DATA TRANSMISSION METHOD AND DEVICE

TECHNICAL FIELD

The present invention relates to the field of information processing technology, and specifically relates to a data transmission method and device.

BACKGROUND ART

Recently, mobile devices are widely used and the related technology thereof is becoming mature.

At present, split-screen technology has been successfully applied to mobile devices. In the mobile devices with split-screen function, the display screen can be divided into two parts, which are respectively used for displaying running interfaces of two application clients in a foreground running status in the mobile device. In this way, when users want to view the running interfaces of the two application clients, they can view them simultaneously on the two split screens without the need to close the running interface of one application client and then opening the running interface of the other application client.

After a mobile device is provided with the split-screen function, although the users can process multiple tasks simultaneously in this mobile device without the need to switch the application clients frequently, two methods are generally used when transmitting data between the two application clients both in the foreground running status in this mobile device:

one method consists in that a source application client stores target data into the mobile device and then a target application client obtains the above target data from the mobile device and inserts the target data into corresponding locations;

the other method consists in that a source application client chooses, via a menu, a target application client to open the target data and thereby transmits the target data to the target application client.

In the prior art, it is necessary to perform several steps in order to complete data transmission when transmitting data between two application clients both in the foreground running status in a mobile device, thus rendering the operation complicated.

SUMMARY OF THE INVENTION

An object of the embodiments of the present invention is to provide a data transmission method and device so as to simplify data transmission operation.

To achieve the object mentioned above, an embodiment of the present invention discloses a data transmission method, which is to be applied to a source client, wherein the source client is a client in a foreground running status in a mobile terminal. The mobile terminal, by means of a split-screen function, divides the display screen thereof into a first split screen for displaying a running interface of the source client and a second split screen for displaying a running interface of a target client, the target client is a client in the foreground running status in the mobile terminal. The method comprises the following steps:

establishing a communication connection between the source client and the target client in the case that preset conditions of establishing a communication connection are satisfied;

receiving a drag instruction for a thumbnail of target data in the source client and moving the thumbnail according to the drag instruction;

monitoring whether a data transmission instruction for the target data is received;

if yes, transmitting the target data to the target client through the established communication connection.

In one specific implementation, the source client comprises a communication unit $T_{U1}$, and the target client comprises a communication unit $T_{U2}$, and the communication unit $T_{U1}$ being identical to the communication unit $T_{U2}$;

the establishing a communication connection between the source client and the target client comprises:

establishing the communication connection between the source client and the target client by invoking the communication unit $T_{U1}$ to establish a communication connection with the communication unit $T_{U2}$.

In one specific implementation, the establishing a communication connection between the source client and the target client in the case that preset conditions of establishing a communication connection are satisfied comprises:

monitoring whether the duration of a long press operation on the thumbnail of the target data in the source client by a user is longer than a preset duration;

if yes, establishing the communication connection between the source client and the target client.

In one specific implementation, after moving the thumbnail according to the drag instruction, the method further comprises:

determining the location $T_1$ of the thumbnail on the first split screen and a portion to be displayed $D_{S1}$ of the thumbnail on the first split screen according to the drag instruction, displaying the portion to be displayed $D_{S1}$ at the location $T_1$ and sending location information and pattern of the thumbnail to the target client through the established communication connection, so that the target client determines the location $T_2$ of the thumbnail of the target data on the second split screen and a portion to be displayed $D_{S2}$ of the thumbnail on the second split screen, and displays the portion to be displayed $D_{S2}$ at the location $T_2$, wherein, the portion to be displayed $D_{S1}$ and the portion to be displayed $D_{S2}$ constitute the whole of the thumbnail.

In one specific implementation, the monitoring whether a data transmission instruction for the target data is received comprises:

monitoring whether the ratio of the portion to be displayed $D_{S2}$ of the thumbnail displayed on the second split screen to the whole of the thumbnail is greater than a preset ratio threshold when a release operation on the thumbnail is performed by a user;

if yes, determining that the data transmission instruction for the target data is received.

To achieve the object mentioned above, an embodiment of the present invention discloses a data transmission device, which is to be applied to a source client, wherein the source client is a client in a foreground running status in a mobile terminal. The mobile terminal, by means of a split-screen function, divides the display screen thereof into a first split screen for displaying a running interface of the source client and a second split screen for displaying a running interface of a target client, the target client is a client in the foreground running status in the mobile terminal. The device comprises a communication connection establishing unit, a drag instruction receiving unit, a data transmission instruction monitoring unit and a data transmitting unit;

wherein, the communication connection establishing unit is used for establishing a communication connection between the source client and the target client in the case that preset conditions of establishing a communication connection are satisfied;

the drag instruction receiving unit is used for receiving a drag instruction for a thumbnail of target data in the source client and moving the thumbnail according to the drag instruction;

the data transmission instruction monitoring unit is used for monitoring whether a data transmission instruction for the target data is received; if yes, triggering the data transmitting unit.

the data transmitting unit is used for transmitting the target data to the target client through the established communication connection.

In one specific implementation, the source client comprises a communication unit $T_{U1}$, and the target client comprises a communication unit $T_{U2}$, the communication unit $T_{U1}$ being identical to the communication unit $T_{U2}$;

the communication connection establishing unit is specifically used for:

in the case that the preset communication connection establishing conditions are satisfied, establishing the communication connection between the source client and the target client by invoking the communication unit $T_{U1}$ to establish a communication connection with the communication unit $T_{U2}$.

In one specific implementation, the communication connection establishing unit comprises a long press operation monitoring subunit and a communication connection establishing subunit;

wherein, the long press operation monitoring subunit is used for monitoring whether the duration of a long press operation on the thumbnail of the target data in the source client by the user is longer than a preset duration, if yes, trigger the communication connection establishing subunit;

the communication connection establishing subunit is used for establishing the communication connection between the source client and the target client.

In one specific implementation, the device further comprises a display portion determining unit, which is used for determining the location $T_1$ of the thumbnail on the first split screen and a portion to be displayed $D_{S1}$ of the thumbnail on the first split screen according to the drag instruction, displaying the portion to be displayed $D_{S1}$ at the location $T_1$, and sending location information and pattern of the thumbnail to the target client through the established communication connection, so that the target client determines the location $T_2$ of the thumbnail of the target data on the second split screen and a portion to be displayed $D_{S2}$ of the thumbnail on the second split screen client, and displays the portion to be displayed $D_{S2}$ at the location $T_2$, wherein, the portion to be displayed $D_{S1}$ and the portion to be displayed $D_{S2}$ constitute the whole of the thumbnail.

In one specific implementation, the data transmission instruction monitoring unit comprises a thumbnail monitoring subunit and a data transmission instruction determining subunit;

wherein, the thumbnail monitoring subunit is used for monitoring whether the ratio of the portion to be displayed $D_{S2}$ of the thumbnail displayed on the second split screen to the whole of the thumbnail is greater than a preset ratio threshold when a release operation on the thumbnail is performed by a user, if yes, triggering the data transmission instruction determining subunit;

the data transmission instruction determining subunit is used for determining that the data transmission instruction for the target data is received.

It can be seen that in the embodiments of the present invention, the mobile terminal divides the display screen thereof into a first split screen and a second split screen by means of the split-screen function and can simultaneously display running interfaces of two application clients, and data transmission between the two application clients in a foreground running status in this mobile terminal is completed by dragging thumbnails. The method simplifies data transmission operation compared with the method for transmitting data between application clients in prior art.

BRIEF DESCRIPTION OF THE DRAWINGS

In order to describe embodiments of the present invention or technical solutions in prior art more clearly, drawings used for describing embodiments of the present invention or the prior art will be described briefly below. It is obvious that the drawings below are for only some embodiments of the present invention, and those skilled in the art can also obtain further drawings based on these drawings without creative efforts.

DETAILED DESCRIPTION

Technical solutions in the embodiments of the present invention will be described below clearly and completely in combination with the drawings of the embodiments of the present invention. Obviously, the described embodiments are only some of the embodiments of the present invention, rather than all of the embodiments. All other embodiments obtained based on the embodiments of the present invention by those skilled in the art without doing creative works fall into the protection scope defined by the present invention.

An embodiment of the present invention discloses a data transmission method and device, which are to be applied to a source client, wherein the source client is a client in a foreground running status in a mobile terminal, the mobile terminal, by means of a split-screen function, divides the display screen thereof into a first split screen for displaying a running interface of the source client and a second split screen for displaying a running interface of a target client, the target client is a client in a foreground running status in the mobile terminal. The method comprises: establishing a communication connection between the source client and the target client; receiving a drag instruction for a thumbnail of target data in the source client and moving the thumbnail according to the drag instruction; monitoring whether a data transmission instruction for the target data is received, if yes, transmitting the target data to the target client through the established communication connection.

The present invention will be described in detail below by means of detailed embodiments.

Figure 1:
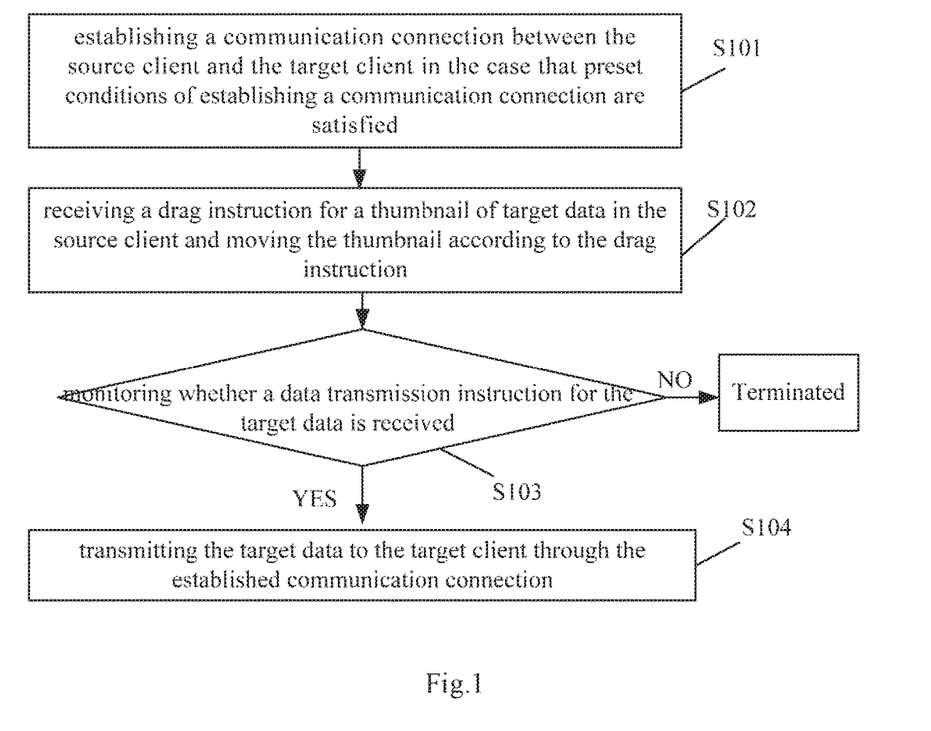
FIG. 1 is a schematic flowchart of a data transmission method provided by an embodiment of the present invention.

Refer to FIG. 1 that is a schematic flowchart of a data transmission method provided by an embodiment of the present invention. The method is to be applied to a source client, wherein the source client is a client in a foreground running status in a mobile terminal. The mobile terminal, by means of a split-screen function, divides the display screen thereof into a first split screen for displaying a running interface of the source client and a second split screen for displaying a running interface of a target client, the target client is a client in the foreground running status in the mobile terminal. The method comprises the following steps:

S101: establishing a communication connection between the source client and the target client in the case that preset conditions of establishing a communication connection are satisfied;

In one implementation of the present invention, the step of establishing communication connection between the source client and the target client in the case that preset conditions of establishing a communication connection are satisfied may comprise:

monitoring whether a communication connection establishing instruction for the target client is received;

if yes, establishing the communication connection between the source client and the target client;

otherwise, terminating the procedure of establishing communication connection.

It is obvious that, in other embodiments of the present invention, if no communication connection establishing instruction for the target client is received during the monitoring procedure, then the procedure of establishing communication connection is terminated and the next procedure of establishing the communication connection can be carried out.

It is to be noted that the source client may comprise a communication unit $T_{U1}$, and the target client may comprise a communication unit $T_{U2}$, the communication unit $T_{U1}$ being identical to the communication unit $T_{U2}$. In this case, the step of establishing a communication connection between the source client and the target client may comprise:

establishing the communication connection between the source client and the target client by invoking the communication unit $T_{U1}$ to establish the communication connection with the communication unit $T_{U2}$.

In a specific implementation of the present invention, the source client monitors at any time whether a communication connection establishing instruction for the target client is received, and if a communication connection establishing instruction for the target client is received during the monitoring procedure, then the communication unit $T_{U1}$ is invoked to establish a communication connection with the communication unit $T_{U2}$ in the target client. The communication connection is essentially the communication connection between the source client and the target client, which allows data transmission between the source client and the target client. If no communication connection establishing instruction for the target client is received during the monitoring procedure, then establishing the communication connection between the source client and the target client is refused.

Moreover, the established communication connection can always exist, and data transmission can be carried out at any time between the source client and the target client; the established communication connection can also allow data transmission to be carried out only once. Furthermore, the established communication connection can also exist for a period of time, during which data transmission can be carried out at any time between the source client and the target client. This is not limited by the present invention.

The application client in the foreground running status as mentioned above can be simply understood as a client whose running interface is visible.

S102: receiving a drag instruction for a thumbnail of target data in the source client and moving the thumbnail according to the drag instruction;

Wherein, the thumbnail can be a section of text or a picture or a table, or can also be a file icon, or can also be a polygon representing the target data, which is not limited by the present invention.

S103: monitoring whether a data transmission instruction for the target data is received, and if yes, executing step S104, otherwise, terminating the data transmission;

It is obvious that, in other embodiments of the present invention, if no data transmission instruction for the target data in the source client is received during the monitoring procedure, then the data transmission is terminated, or transmission of next target data can be carried out, or the communication connection between the target client and the source client can be re-establish.

S104: transmitting the target data to the target client through the established communication connection;

In practice, in the case that the communication connection is established, when a data transmission instruction for target data in a source client is received, it is possible to transmit the target data to the target client through this communication connection.

Assume that the two application clients in the foreground running status on the two split-screens of a mobile terminal are a QQ client and a WPS client respectively, the thumbnail of target data can be directly dragged from the QQ client to the WPS client by a user in a dragging manner, and the target data is transmitted to the WPS client when a data transmission instruction is received.

Moreover, if the QQ client and the WPS client in the foreground running status on the two split-screens of a mobile terminal are both provided with a communication unit, such as WPS SDK, the communication connection can be established through the communication units. If a picture "a" in the QQ client is required to be delivered to the WPS client, it is possible to transmit location information and pattern of the thumbnail of the picture "a" through the communication connection established by the communication units, and when a data transmission instruction is received, to transmit data of the picture "a" through the communication connection established by the communication units.

It should be noted that data transmission can occur during moving a thumbnail, or can also occur after moving a thumbnail, which is not limited by the present invention.

By applying the embodiment of FIG. 1, a mobile terminal divides the display screen thereof into a first split screen and a second split screen by means of the split-screen function and can simultaneously display running surfaces of the two clients. Data transmission between two application clients in the foreground running status in this mobile terminal is realized in a dragging manner. This method simplifies data transmission operation compared with the methods for transmitting data between clients in the prior art.

Figure 2:
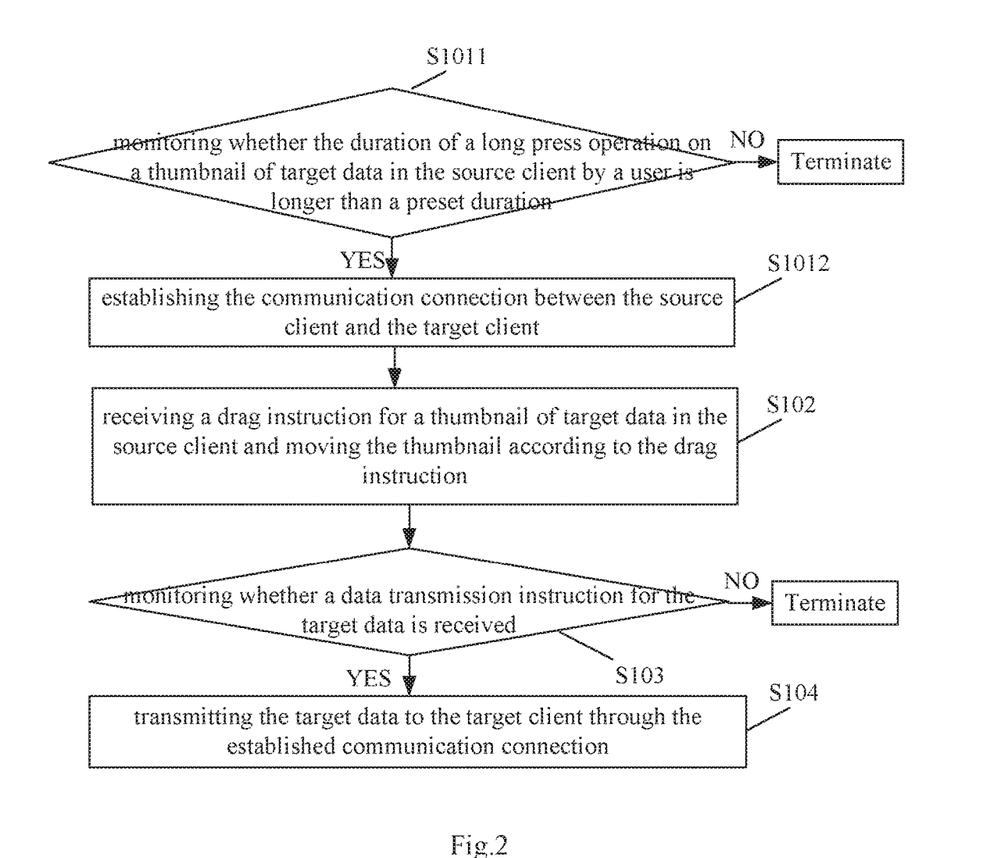
FIG. 2 is a schematic flowchart of another data transmission method provided by an embodiment of the present invention.

Moreover, an embodiment of the present invention provides another data transmission method. Refer to FIG. 2, which is a schematic flowchart of another data transmission method provided by an embodiment of the present invention. The method is to be applied to a source client, wherein the source client is a client in a foreground running status in a mobile terminal. The mobile terminal, by means of a split-screen function, divides the display screen thereof into a first split screen for displaying a running interface of the source client and a second split screen for displaying a running interface of a target client, the target client is a client in the foreground running status in the mobile terminal. The method may comprises the following steps:

S1011: monitoring whether the duration of a long press operation on a thumbnail of target data in the source client by a user is longer than a preset duration, if yes, continuing to execute step S1012, otherwise, terminating the monitoring procedure.

Of course, in other embodiments of the present invention, if the duration of a long press operation to the target data in the source client by a user is longer than the preset duration, then the monitoring procedure is terminated, and the next procedure of monitoring whether the duration of a long press operation is longer than a preset duration can be carried out;

S1012: establishing the communication connection between the source client and the target client.

According to the assumption in the above step S104, if the preset duration is 5 s and it is monitored that the picture "a" in the QQ client is long pressed by a user for 6 s, then since 6 s is longer than 5 s, the QQ client determines that a communication connection establishing instruction for the WPS client is received and establishes a communication connection between the QQ client and the WPS client. At that time, the user can carry out a dragging operation, drag the thumbnail of the picture "a" into the WPS client, and sends the picture "a" to the WPS client when a data transmission instruction is received.

By applying the embodiment of FIG. 2, a mobile terminal divides the display screen thereof into a first split screen and a second split screen by means of a split-screen function and can simultaneously display running surfaces of the two application clients. Data transmission between the two clients in a foreground running status in this mobile terminal is completed in a dragging manner. This method simplifies data transmission operation compared with the method for transmitting data between clients in the prior art.

Figure 3:
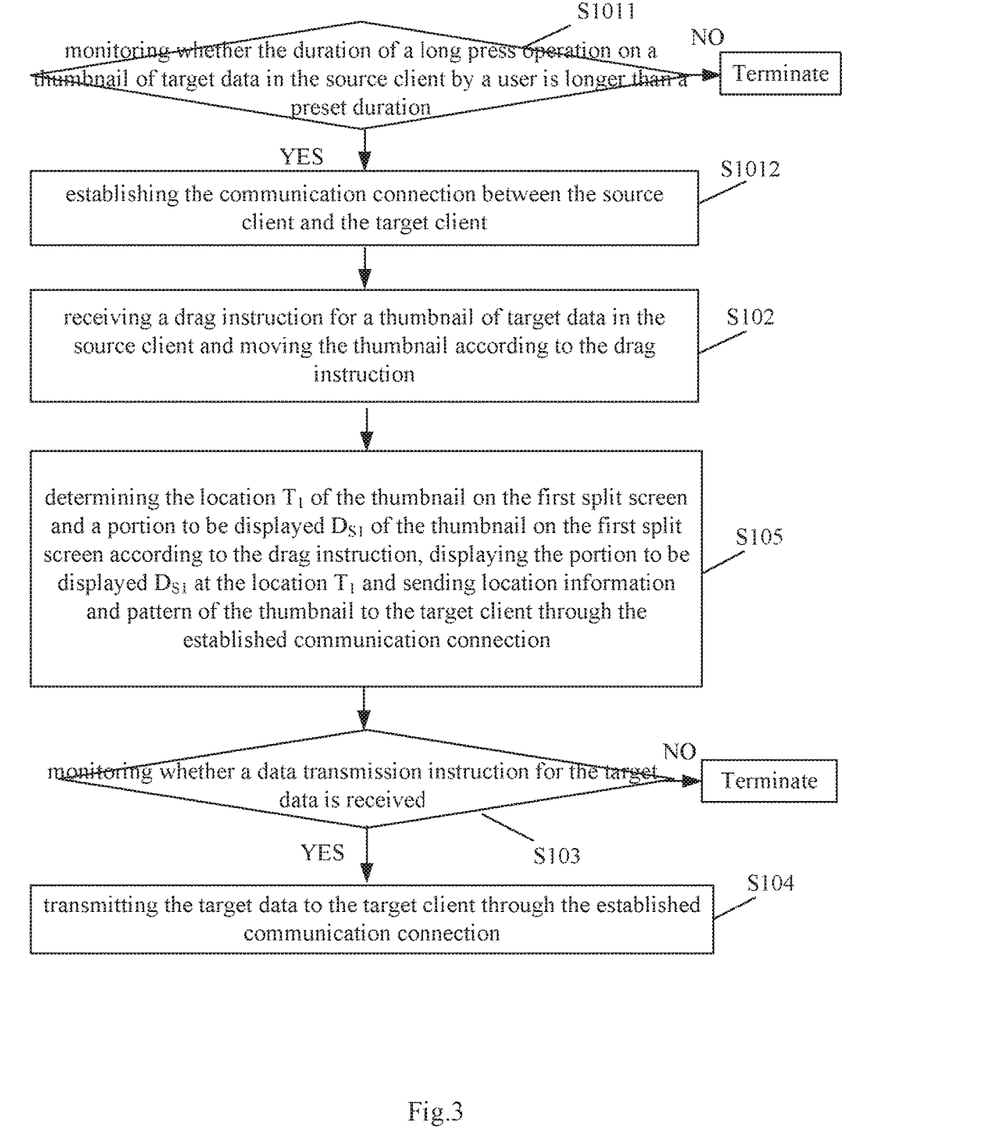
FIG. 3 is a schematic flowchart of another data transmission method provided by an embodiment of the present invention.

Moreover, when a thumbnail of target data is a specific image, such as a section of text, a picture, a table or a file icon related to the target data, an embodiment of the present invention provides another data transmission method. Refer to FIG. 3, which is a schematic flowchart of another data transmission method provided by an embodiment of the present invention. The method is to be applied to a source client, wherein the source client is a client in a foreground running status in a mobile terminal. The mobile terminal, by means of a split-screen function, divides the display screen thereof into a first split screen for displaying a running interface of the source client and a second split screen for displaying a running interface of a target client, the target client is a client in the foreground running status in the mobile terminal. The method may comprises the following steps:

S105: determining the location $T_1$ of the thumbnail on the first split screen and a portion to be displayed $D_{S1}$ of the thumbnail on the first split screen according to the drag instruction, displaying the portion to be displayed $D_{S1}$ at the location $T_1$ and sending location information and pattern of the thumbnail to the target client through the established communication connection.

With this method, it is possible for the target client to determine the location $T_2$ of the thumbnail of the target data on the second split screen and a portion to be displayed $D_{S2}$ of the thumbnail on the second split screen according to the location information and the pattern of the thumbnail, and display the portion to be displayed $D_{S2}$ at the location $T_2$, wherein, the portion to be displayed $D_{S1}$ and the portion to be displayed $D_{S2}$ constitute the whole of the thumbnail.

Figure 4:
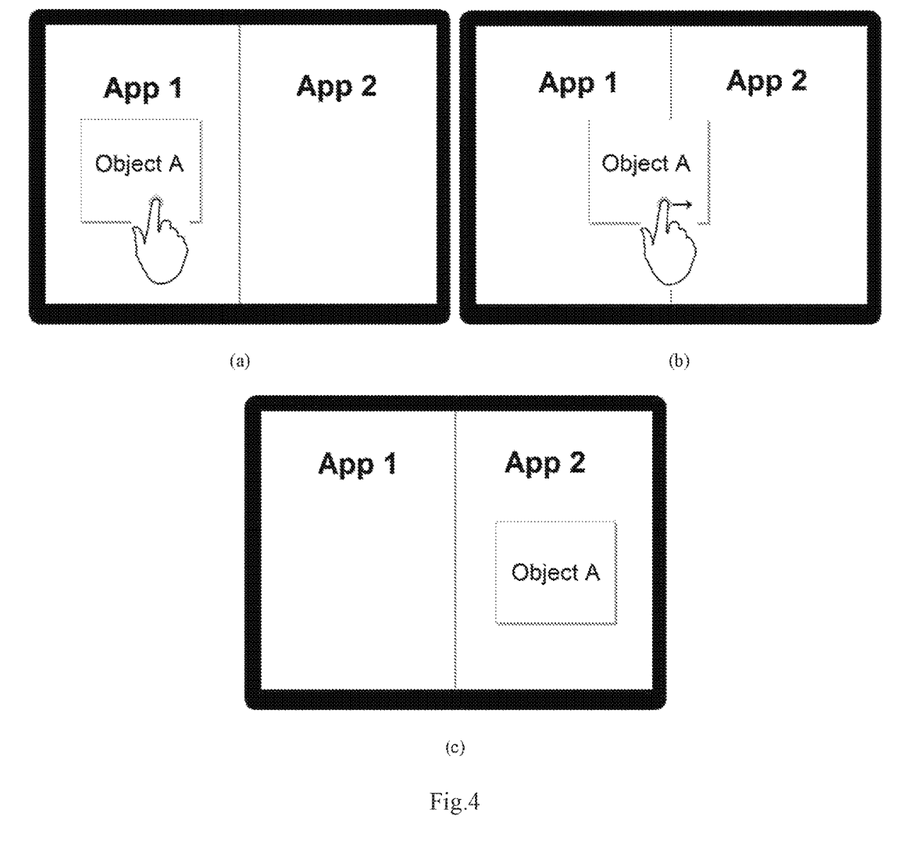
FIG. 4 is a schematic illustration of a dragging operation provided by an embodiment of the present invention.

Wherein, the location information mentioned above can be the location of the thumbnail with respect to the whole screen, and the pattern of the thumbnail can be information such as the shape (e.g. rectangle, circular, polygon, etc.), the size or the pixel of the thumbnail. As shown in FIG. 4(a), (b), (c) which are schematic illustration of a dragging operation provided by an embodiment of the present invention, it is possible to display corresponding thumbnail during the thumbnail dragging procedure according to the information. As can be seen from FIG. 4, the object data (object A) when being dragged into the object client (App2) first passes (a), and then (b) and finally (c), and then the target data transmission is completed.

During the dragging procedure, the source client acquires the location information of a thumbnail with respect to the whole screen and the pattern of the thumbnail, and sends the information to the target client; the source client determines the location $T_1$ of the thumbnail on the first split screen according to the acquired location information, and determines the content of the thumbnail to be displayed at the location $T_1$, i.e. the portion to be displayed $D_{S1}$, according to the pattern of the thumbnail corresponding to the location; the target client determines the location $T_2$ of the thumbnail on the second split screen according to the received location information, and determines the content of the thumbnail to be displayed at the location $T_2$, i.e., the portion to be displayed $D_{S2}$, according to the pattern of the thumbnail corresponding to the location. As shown in FIG. 4(b), the thumbnail of the target data (object A) is dragged to the segment line of the split screens, a portion of the thumbnail of the target data is displayed in the source client (App1), the other portion of the thumbnail of the target data is displayed in the target client (App2), and the thumbnails of these two portions constitute the whole of the thumbnail of the target data (object A), which creates an effect of traversing to the target client (App2) and provides users with an excellent visual effect.

Moreover, in a specific implementation, when the thumbnail of the target data is an abstractive icon such as a polygon representing target data, upon receiving a data transmission instruction, the specific image of the target data moves in a leap to the location where the release operation is performed when a data transmission instruction is received, or the specific image of the target data can be displayed immediately at the location where the release operation is performed when a data transmission instruction is received.

By applying the embodiment of FIG. 3, a mobile terminal divides the display screen thereof into a first split screen and a second split screen by means of the split-screen function and can simultaneously display running surfaces of the two clients. Data transmission between the two application clients in a foreground running status in this mobile terminal is realized in a dragging manner. The method simplifies data transmission operation compared with the method for transmitting data between clients in the prior art.

Figure 5:
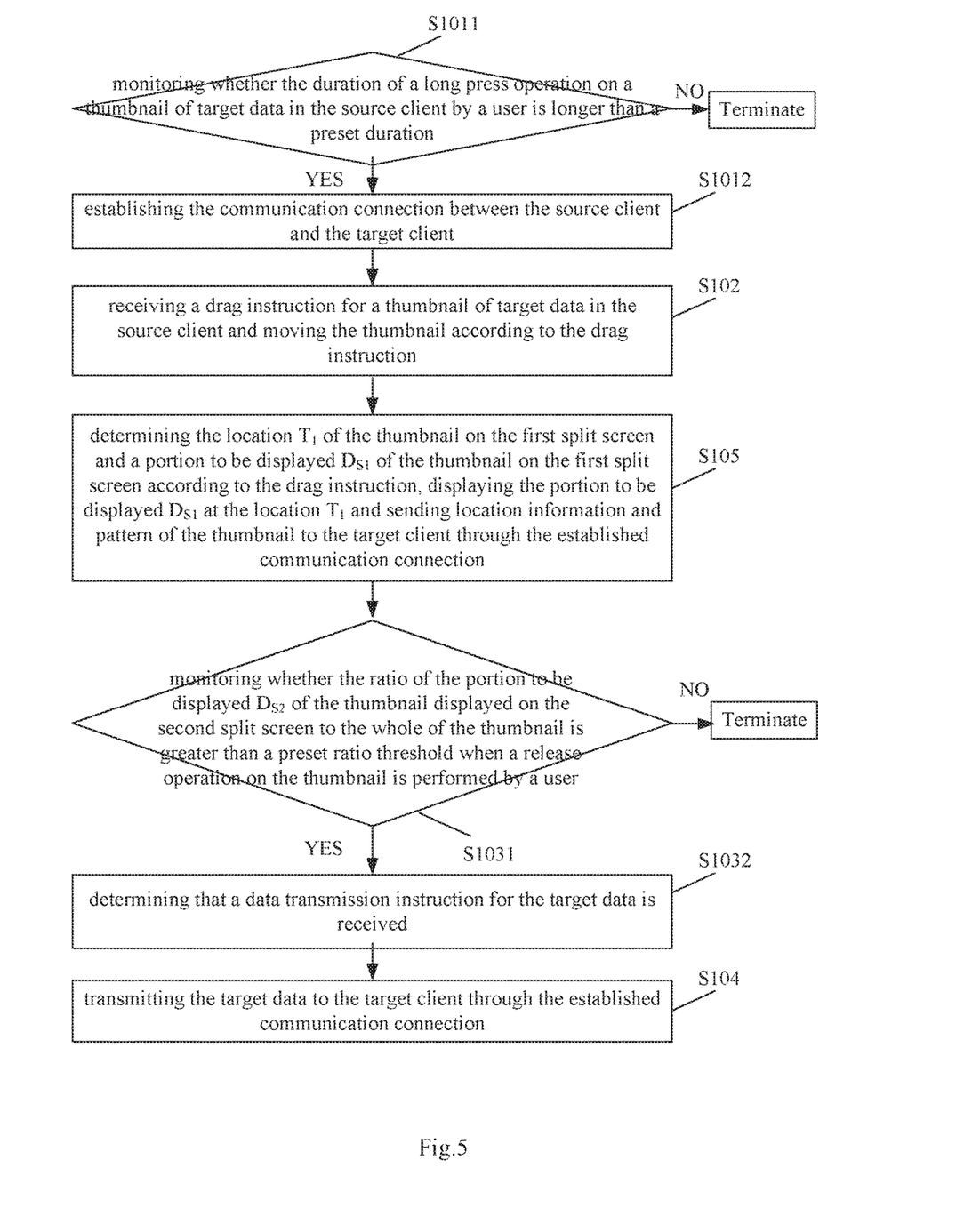
FIG. 5 is a schematic flowchart of another data transmission method provided by an embodiment of the present invention.

Moreover, an embodiment of the present invention provides another data transmission method. Refer to FIG. 5, which is a schematic flowchart of another data transmission method provided by an embodiment of the present invention. The method is to be applied to a source client, wherein the source client is a client in a foreground running status in a mobile terminal. The mobile terminal, by means of split-screen function, divides the display screen thereof into a first split screen for displaying a running interface of the source client and a second split screen for displaying a running interface of a target client, the target client is a client in the foreground running status in the mobile terminal. The method may comprise the following steps:

S1031: monitoring whether the ratio of the portion to be displayed $D_{S2}$ of the thumbnail displayed on the second split screen to the whole of the thumbnail is greater than a preset ratio threshold when a release operation on the thumbnail is performed by a user; if yes, executing the step S1032, otherwise, terminating the data transmission.

S1032: determining that a data transmission instruction for the target data is received.

It is obvious that, in other embodiments of the present invention, if the ratio of the portion to be displayed $D_{S2}$ of a thumbnail displayed on the second split screen to the whole of the thumbnail is not greater than the preset ratio threshold when a release operation is performed, then the data transmission is terminated. And monitoring whether the ratio of the portion to be displayed $D_{S2}$ of a thumbnail displayed on the second split screen to the whole of the thumbnail is not greater than a preset ratio threshold can be done again when a release operation is performed, and the communication connection between the source client and the target client can be re-established.

Assume that the preset ratio threshold is 1/2, the ratio of the portion to be displayed $D_{S2}$ displayed on the second split screen to the whole of the thumbnail is 3/4 when a release operation is performed, then it is determined that a data transmission instruction for target data is received since 3/4>1/2. Here, the preset ratio threshold can be modified according to the requirement of users and can be set to be 1/3, 2/3, 3/4 or 1, which is not limited by the present invention.

In practice, assume that the preset ratio threshold is 1, then judge whether the whole thumbnail is displayed on the second split screen when a release operation is performed, and if yes, it is determined that a data transmission instruction for the target data is received.

In one specific implementation, judging whether a whole thumbnail is displayed on the second split screen when a release operation is performed can consist in: judging whether the point where a user touches the screen of a mobile is located on the second split screen, if yes, it can be determined that the whole thumbnail is displayed on the second split screen, therefore it is determined that a data transmission instruction for target data is received, and then the target data is transmitted.

In another specific implementation, judging whether a whole thumbnail is displayed on the second split screen when a release operation is performed can consist in: judging whether the portion to be displayed of the thumbnail is completely displayed on the second split screen, if yes, it can be determined that the whole thumbnail is displayed on the second split screen, therefore it is determined that a data transmission instruction for the target data is received, then the target data is transmitted; otherwise, as shown in FIG. 4(b), a portion of the thumbnail is displayed on the first split screen and the other portion is displayed on the second split screen, then it is determined that no data transmission instruction for the target data is received and data transmission is refused.

By applying the embodiment of FIG. 5, a mobile terminal divides the display screen thereof into a first split screen and a second split screen by means of the split-screen function and can simultaneously display running surfaces of the two clients. Data transmission between the two clients in a foreground running status in the mobile terminal is completed in a dragging manner. The method simplifies data transmission operation compared with the method for transmitting data between clients in the prior art.

Figure 6:
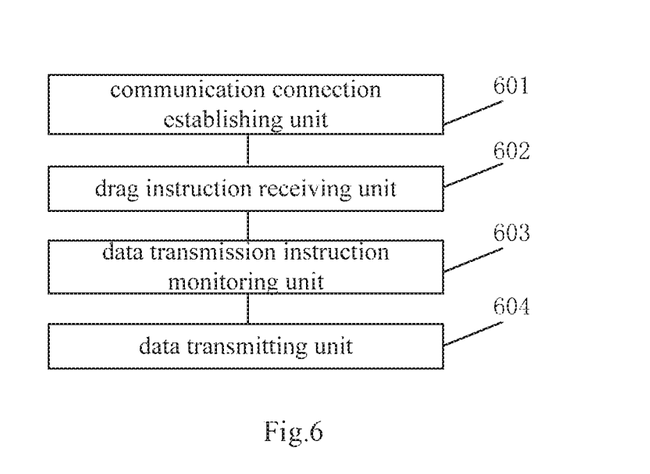
FIG. 6 is a schematic structural illustration of a data transmission device provided by an embodiment of the present invention.

Refer to FIG. 6 that is a schematic structural illustration of a data transmission device provided by an embodiment of the present invention. The device corresponds to the flowchart as shown in FIG. 1 and is to be applied to a source client, wherein the source client is a client in a foreground running status in a mobile terminal. The mobile terminal, by means of a split-screen function, divides the display screen thereof into a first split screen for displaying a running interface of the source client and a second split screen for displaying a running interface of a target client, the target client is a client in the foreground running status in the mobile terminal. The device can comprise a communication connection establishing unit 601, a drag instruction receiving unit 602, a data transmission instruction monitoring unit 603 and a data transmitting unit 604.

Wherein, the communication connection establishing unit 601 is used for establishing a communication connection between the source client and the target client in the case that preset conditions of establishing a communication connection are satisfied.

The drag instruction receiving unit 602 is used for receiving a drag instruction for a thumbnail of target data in the source client and moving the thumbnail according to the drag instruction.

The data transmission instruction monitoring unit 603 is used for monitoring whether a data transmission instruction for the target data is received; if yes, triggering the data transmitting unit.

The data transmitting unit 604 is used for transmitting the target data to the target client through the established communication connection.

In one specific implementation, the source client comprises a communication unit $T_{U1}$, the target client comprises a communication unit $T_{U2}$, and the communication unit $T_{U1}$ being identical to the communication unit $T_{U2}$.

In this case, the communication connection establishing unit 601 is specifically used for:

in the case that the preset conditions of establishing a communication connection are satisfied, establishing the communication connection between the source client and the target client by invoking the communication unit $T_{U1}$ to establish the communication connection with the communication unit $T_{U2}$.

By applying the embodiment of FIG. 6, a mobile terminal divides the display screen thereof into a first split screen and a second split screen by means of a split-screen function and can simultaneously display running surfaces of the two clients. Data transmission between the two clients in a foreground running status in the mobile terminal is completed in a dragging manner. The method simplifies data transmission operation compared with the method for transmitting data between clients in the prior art.

Figure 7:
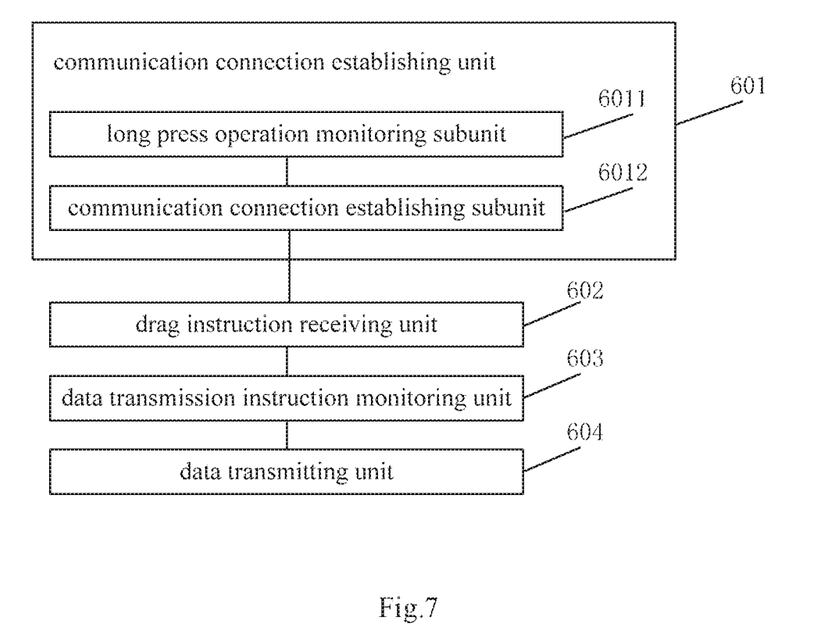
FIG. 7 is a schematic structural illustration of a data transmission device provided by another embodiment of the present invention.

Moreover, an embodiment of the present invention provides another data transmission device. Refer to FIG. 7, which is a schematic structural illustration of another data transmission device provided by an embodiment of the present invention. The device corresponds to the flowchart as shown in FIG. 2 and is to be applied to a source client, wherein the source client is a client in a foreground running status in a mobile terminal. The mobile terminal, by means of a split-screen function, divides the display screen thereof into a first split screen for displaying a running interface of the source client and a second split screen for displaying a running interface of a target client, which is a client in the foreground running status in the mobile terminal. The device can comprise a long press operation monitoring subunit 6011 and a communication connection establishing subunit 6012.

Specifically, the communication connection establishing unit 601 mentioned above can comprise a long press operation monitoring subunit 6011 and a communication connection establishing subunit 6012.

The long press operation monitoring subunit 6011 is used for monitoring whether the duration of a long press operation on the thumbnail of the target data in the source client by the user is longer than a preset duration, if yes, triggering the communication connection establishing subunit 6012.

The communication connection establishing subunit 6012 is used for establishing the communication connection between the source client and the target client.

By applying the embodiment of FIG. 7, a mobile terminal divides the display screen thereof into a first split screen and a second split screen by means of a split-screen function and can simultaneously display running surfaces of the two clients. Data transmission between the two clients in a foreground running status in the mobile terminal is completed in a dragging manner. The method simplifies data transmission operation compared with the method for transmitting data between clients in the prior art.

Figure 8:
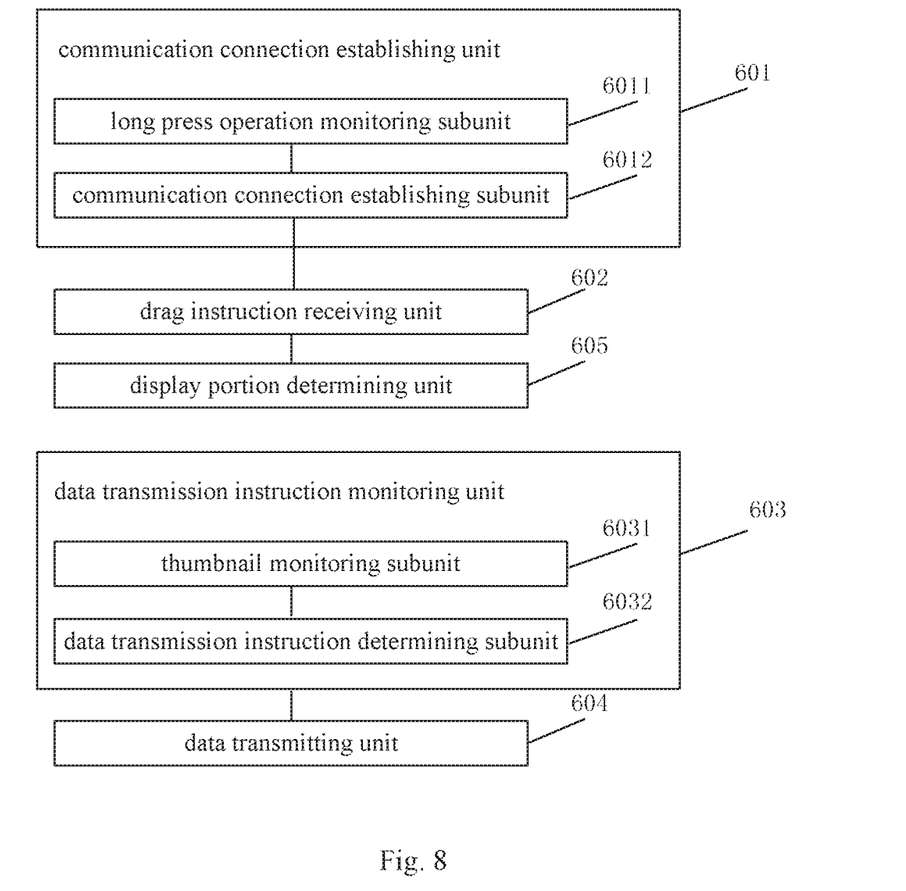
FIG. 8 is a schematic structural illustration of a data transmission device provided by another embodiment of the present invention.

Moreover, an embodiment of the present invention also provides another data transmission device. Refer to FIG. 8, which is a schematic structural illustration of another data transmission device provided by an embodiment of the present invention. The device which corresponds to the flowchart as shown in FIG. 5 and is to be applied to a source client, wherein the source client is a client in a foreground running status in a mobile terminal. The mobile terminal, by means of the split-screen function, divides the display screen thereof into a first split screen for displaying a running interface of the source client and a second split screen for displaying a running interface of a target client, the target client is a client in the foreground running status in the mobile terminal. The device can comprise a display portion determining unit 605, a thumbnail monitoring subunit 6031 and a data transmission instruction determining subunit 6032.

Wherein, the display portion determining unit 605 is used determining the location $T_1$ of the thumbnail on the first split screen and a portion to be displayed $D_{S1}$ of the thumbnail on the first split screen according to the drag instruction, displaying the portion to be displayed $D_{S1}$ at the location $T_1$, and sending location information and pattern of the thumbnail to the target client through the established communication connection, so that the target client determines the location $T_2$ of the thumbnail of the target data on the second split screen and a portion to be displayed $D_{S2}$ of the thumbnail on the second split screen according to the location information and the pattern of the thumbnail, and displays the portion to be displayed $D_{S2}$ at the location $T_2$, wherein, the portion to be displayed $D_{S1}$ and the portion to be displayed $D_{S2}$ constitute the whole of the thumbnail.

The thumbnail monitoring subunit 6031 is used for monitoring whether the ratio of the portion to be displayed $D_{S2}$ of the thumbnail displayed on the second split screen to the whole of the thumbnail is greater than a preset ratio threshold when a release operation on the thumbnail by a user is performed, and if yes, triggering the data transmission instruction determining subunit.

The data transmission instruction determining subunit 6032 is used for determining that the data transmission instruction for the target data is received.

By applying the embodiment of FIG. 8, a mobile terminal divides the display screen thereof into a first split screen and a second split screen by means of a split-screen function and can simultaneously display running surfaces of the two clients. Data transmission between the two clients in a foreground running status in this mobile terminal is completed in a dragging manner. The method simplifies data transmission operation compared with the method for transmitting data between clients in the prior art.

The embodiments of the device are briefly described and reference can be made to the description of the embodiments of the method for its related contents since the embodiments of the device are substantially similar to those of the method.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements comprise not only those elements listed, but also other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices which comprise the listed elements.

It can be understood by a person skilled in the art that all or a part of steps in the implementations of the above method can be carried out by related hardware being instructed by programs, which can be stored in computer readable storage medium, such as ROM/RAM, disk and optical disk etc.

The embodiments described above are just preferable embodiments of the present invention, and not indented to limit the protection scope of the present invention. Any modifications, alternatives, improvements or the like within the spirit and principle of the present invention are comprised in the protection scope of the present invention.

What is claimed is:

1. A data transmission method, which is to be applied to a source client, wherein the source client is a client in a foreground running status in a mobile terminal, the mobile terminal, by means of a split-screen function, divides the display screen thereof into a first split screen for displaying a running interface of the source client and a second split screen for displaying a running interface of a target client, and the target client is a client in the foreground running status in the mobile terminal, characterized in that the method comprises:

establishing a communication connection between the source client and the target client in the case that preset conditions of establishing a communication connection are satisfied;

receiving a drag instruction for a thumbnail of target data in the source client and moving the thumbnail according to the drag instruction;

determining the location $T_1$ of the thumbnail on the first split screen and a portion to be displayed $D_{S1}$ of the thumbnail on the first split screen according to the drag instruction, displaying the portion to be displayed $D_{S1}$ at the location $T_1$, and sending location information and pattern of the thumbnail to the target client through the established communication connection, so that the target client determines the location $T_2$ of the thumbnail of the target data on the second split screen and a portion to be displayed $D_{S2}$ of the thumbnail on the second split screen, and displays the portion to be displayed $D_{S2}$ at the location $T_2$, wherein, the portion to be displayed $D_{S1}$ and the portion to be displayed $D_{S2}$ constitute the whole of the thumbnail;

monitoring whether the ratio of the portion to be displayed $D_{S2}$ of the thumbnail displayed on the second split screen to the whole of the thumbnail is greater than a preset ratio threshold when a release operation on the thumbnail is performed by a user;

if the ratio of the portion to be displayed $D_{S2}$ of the thumbnail displayed on the second split screen to the whole of the thumbnail is greater than the preset ratio threshold, determining that the data transmission instruction for the target data is received, and transmitting the target data to the target client through the established communication connection.

2. The method according to claim 1, characterized in that the source client comprises a communication unit $T_{U1}$, and the target client comprises a communication unit $T_{U2}$, the communication unit $T_{U1}$ being identical to the communication unit $T_{U2}$;

the establishing a communication connection between the source client and the target client comprises:

establishing the communication connection between the source client and the target client by invoking the communication unit $T_{U1}$ to establish a communication connection with the communication unit $T_{U2}$.

3. The method according to claim 2, characterized in that the establishing a communication connection between the source client and the target client in the case that preset conditions of establishing a communication connection are satisfied comprises:

monitoring whether the duration of a long press operation on the thumbnail of the target data in the source client by a user is longer than a preset duration;

if the duration of the long press operation is longer than the preset duration, establishing the communication connection between the source client and the target client.

4. The method according to claim 1, characterized in that the establishing a communication connection between the source client and the target client in the case that preset conditions of establishing a communication connection are satisfied comprises:

monitoring whether the duration of a long press operation on the thumbnail of the target data in the source client by a user is longer than a preset duration;

if the duration of the long press operation is longer than the preset duration, establishing the communication connection between the source client and the target client.

5. A data transmission device, which is to be applied to a source client, wherein the source client is a client in a foreground running status in a mobile terminal, the mobile terminal, by means of a split-screen function, divides the display screen thereof into a first split screen for displaying a running interface of the source client and a second split screen for displaying a running interface of a target client, the target client is a client in the foreground running status in the mobile terminal, characterized in that the device comprises a communication connection establishing unit, a drag instruction receiving unit, a display portion determining unit, a data transmission instruction monitoring unit and a data transmitting unit;

wherein, the communication connection establishing unit is used for establishing a communication connection between the source client and the target client in the case that preset conditions of establishing a communication connection are satisfied;

the drag instruction receiving unit is used for receiving a drag instruction for a thumbnail of target data in the source client and moving the thumbnail according to the drag instruction;

the display portion determining unit, which is used for determining the location $T_1$ of the thumbnail on the first split screen and a portion to be displayed $D_{S1}$ of the thumbnail on the first split screen according to the drag instruction, displaying the portion to be displayed $D_{S1}$ at the location $T_1$, and sending location information and pattern of the thumbnail to the target client through the established communication connection, so that the target client determines the location $T_2$ of the thumbnail of the target data on the second split screen and a portion to be displayed $D_{S2}$ of the thumbnail on the second split screen, and displays the portion to be displayed $D_{S2}$ at the location $T_2$, wherein, the portion to be displayed $D_{S1}$ and the portion to be displayed $D_{S2}$ constitute the whole of the thumbnail;

the data transmission instruction monitoring unit is used for monitoring whether the ratio of the portion to be displayed $D_{S2}$ of the thumbnail displayed on the second split screen to the whole of the thumbnail is greater than a preset ratio threshold when a release operation on the thumbnail is performed by a user, if the ratio of the portion to be displayed $D_{S2}$ of the thumbnail displayed on the second split screen to the whole of the thumbnail is greater than the preset ratio threshold, determining that the data transmission instruction for the target data is received and triggering the data transmitting unit;

the data transmitting unit is used for transmitting the target data to the target client through the established communication connection.

6. The device according to claim 5, characterized in that the source client comprises a communication unit $T_{U1}$, and the target client comprises a communication unit $T_{U2}$, the communication unit $T_{U1}$ being identical to the communication unit $T_{U2}$;

the communication connection establishing unit is specifically used for:

in the case that the preset conditions of establishing a communication connection are satisfied, establishing the communication connection between the source client and the target client by invoking the communication unit $T_{U1}$ to establish a communication connection with the communication unit $T_{U2}$.

7. The device according to claim 6, characterized in that the communication connection establishing unit comprises a long press operation monitoring subunit and a communication connection establishing subunit;

wherein, the long press operation monitoring subunit is used for monitoring whether the duration of a long press operation on the thumbnail of the target data in the source client by a user is longer than a preset duration, if the duration of the long press operation on the thumbnail of the target data in the source client by the user is longer than the preset duration, triggering the communication connection establishing subunit;

the communication connection establishing subunit is used for establishing the communication connection between the source client and the target client.

8. The device according to claim 5, characterized in that the communication connection establishing unit comprises a long press operation monitoring subunit and a communication connection establishing subunit;

wherein, the long press operation monitoring subunit is used for monitoring whether the duration of a long press operation on the thumbnail of the target data in the source client by a user is longer than a preset duration, if the duration of the long press operation on the thumbnail of the target data in the source client by the user is longer than the preset duration, triggering the communication connection establishing subunit;

the communication connection establishing subunit is used for establishing the communication connection between the source client and the target client.

\* \* \* \* \*